United States Patent [19]

Weichselgartner

[11] Patent Number: 4,741,882

[45] Date of Patent: May 3, 1988

[54] ARRANGEMENT FOR CLEANING GASEOUS ATMOSPHERES FROM A PLURALITY OF SEPARATE, CONTAINED WORKING SPACES

[75] Inventor: Heinrich Weichselgartner, Munich, Fed. Rep. of Germany

[73] Assignee: Max-Planck-Gesellschaft Zur Foerderung Der Wissenschaften e.V., Goettingen, Fed. Rep. of Germany

[21] Appl. No.: 826,138

[22] Filed: Feb. 4, 1986

[30] Foreign Application Priority Data

Mar. 28, 1985 [DE] Fed. Rep. of Germany ....... 3511320

[51] Int. Cl.[4] .............................................. B01D 50/00

[52] U.S. Cl. .................................... 422/122; 422/125; 422/169; 55/385 A; 55/DIG. 18

[58] Field of Search ............... 55/58, 179, 189, 385 A, 55/DIG. 18; 422/122, 125, 169, 178, 189, 223

[56] References Cited

U.S. PATENT DOCUMENTS

| | | | |
|---|---|---|---|
| 3,137,549 | 6/1964 | Kilgore et al. | 55/180 |
| 3,141,748 | 7/1964 | Hoke et al. | 55/58 |
| 3,498,025 | 3/1970 | Bednarske | 55/58 |
| 4,056,369 | 11/1977 | Quackenbush | 55/58 |
| 4,289,505 | 9/1981 | Hardison et al. | 55/180 |
| 4,425,142 | 1/1984 | Mann | 55/58 |
| 4,462,811 | 7/1984 | Dinsmore et al. | 55/58 |
| 4,470,955 | 9/1984 | Collins et al. | 422/169 |
| 4,490,288 | 12/1984 | Weichselgartner | 252/630 |
| 4,566,881 | 1/1986 | Richter et al. | 55/179 |

FOREIGN PATENT DOCUMENTS

| | | |
|---|---|---|
| 1009166 | 5/1957 | Fed. Rep. of Germany . |
| 1263717 | 3/1968 | Fed. Rep. of Germany . |
| 2138241 | 2/1973 | Fed. Rep. of Germany . |

OTHER PUBLICATIONS

PPL-Digest, "Tritium handling on TFTR", Princeton Plasma Physics laboratory, Jun. 1982.
Nukem-Information "Tritium-Adsorptionsanlagen", Tritium Technology N-753-4.3.
Molekularsieb-Prospekt der Fa. Grace von 1969.
Nukem-Bedienungsanleitung, Apr. 1973.

*Primary Examiner*—David L. Lacey
*Attorney, Agent, or Firm*—Brumbaugh, Graves, Donohue & Raymond

[57] ABSTRACT

An arrangement for cleaning gaseous atmosphere from a plurality of separate, contained working spaces by removal of noxious, in particular radioactive, gases, such as tritium. Each working space is provided with an individual gas circuit having a circulation pump. Each gas circuit contains a regenerable absorption device, for separation and temporary intermediate storage of the gases to be removed as well as a device for release of the intermediately stored gases. Moreover, a common gas removal unit is provided which can be connected selectively with the separation and intermediate-storage device of each working space circuit and which contains a vacuum pump arrangement for drawing off the gases released in the separation and storage device connected at the time, a vessel for receiving the drawn-off gases, and a device connected with the vessel for binding the gases to be removed.

10 Claims, 1 Drawing Sheet

ARRANGEMENT FOR CLEANING GASEOUS ATMOSPHERES FROM A PLURALITY OF SEPARATE, CONTAINED WORKING SPACES

BACKGROUND OF THE INVENTION

The present invention concerns an arrangement for cleaning gaseous atmosphere from a plurality of separate, contained working spaces by means of removal of noxious, in particular radioactive, gases, such as tritium, with an individual gas circuit containing a circulating pump for each working space.

Large tritium laboratories comprise the most varied experimental devices, each of which is housed in its own contained working space ("containment"), such as a glove box, a caisson and the like. These containments are operated in part at atmospheric pressure and in part under a vacuum; they may contain plain air, a purified atmosphere (air from which the oxygen and/or any possible humidity has been removed), or an inert gas, such as a rare gas.

The experiments or operating devices installed in the working spaces contain, in general, varying tritium quantities, and their hazard potential varies likewise. Examples of such differing devices are all-metal apparatus, systems with open sample-taking, electrolytic cells with a high probability that tritiated water vapors are set free, tempered metal getters whereby T-permeation or leakage may occur, just to mention a few examples.

The atmosphere of such contained working spaces is constantly monitored for reasons of safety and is processed through installations for tritium removal, whereby there must be taken into consideration so-called normal releases (release of tritium through permeation, leakage, maintenance, taking of samples) as well as breakdown release (sudden release of the entire tritium stock).

A method is known whereby each containment is provided with its own device for tritium removal which is adjusted individually to the prevailing circumstances, i.e., it is designed specifically in consideration, e.g., of throughput, T-absorption ability, servicing interval and risk potential for the working space concerned and the experimental and operating installations contained therein. This solution, however, is very costly in that for each working space there must be provided separate blowers or fans, compressors, reactors, absorption sections, filters, heat exchangers, regulating and control organs, etc.

The installation effort may be decreased by a central tritium removal system which is connected with several or all contained working spaces of the laboratory. Such a central system, however, must answer the requirements of all working spaces, namely: the atmosphere (e.g., air, inert gas, rare gas, with or without oxygen, with or without moisture); the pressure conditions (overpressure, vacuum, atmospheric pressure, low or high flow rate); the danger potential (kind of experiment and of the outer containment, such as metallic, open, etc.); and the tritium content (quantity calculated absolutely), condition of the aggregate (gaseous or bound with solid or liquid substances), etc. From this it follows that a central system must be operated with a great variety of operating states. This drastically increases the number of the regulating and control organs for pressure, temperature, flow rate, added-gas metering, etc., and large throughput and pressure ranges are required for the fans, blowers and compressors. The control of catalytic converters, the dimensioning of absorption sections, of filters and separators must comprise wide ranges which can be covered only with difficulty by process engineering. Therefore, a central system is complex and intricate, the safety conditions are hard to determine and are therefore easily planned in an unrealistic manner, while breakdowns and failures of the system can be controlled only with difficulty.

Similar problems also occur in other plants in which radioactive or other noxious gases must be removed from separate working spaces.

SUMMARY OF THE INVENTION

Accordingly, it is an object of the present invention to provide a retention system for a plurality of containments which can be optimally adjusted to the conditions of each individual working space, on the one hand, and which can facilitate a largely centralized processing of the gases to be removed with a minimum effort in installations, on the other hand.

Pursuant to this object, and others which will become apparent hereafter, one aspect of this invention resides in each gas circuit containing a regenerable means for separation and temporary intermediate storage of the gases to be removed as well as a device for release of the intermediately stored gases. Additionally, a common gas removal unit is provided which can be connected selectively with the separation means and the intermediate-storage means of each working space circuit and which contains a vacuum pump arrangement for drawing-off the gases released in the means connected at the time, as well as a vessel for receiving the drawing-off gases and a device connected with the vessel for binding of the gases to be removed.

Due to the fact that each working space is associated with an individual sorption unit adapted to the conditions of the working space and that a common plant element is provided for processing of the gases, containing, e.g., tritium, from all of the said individual sorption units, optimal adaptation to the conditions of the individual working spaces as well as an effective processing of the gases to be removed are ensured at a small effort in appliances.

The regenerable means may contain a tritium sorption device and the common gas removal unit then contains a device for the binding of tritium-containing components of the sucked-off gases. The regenerable tritium sorption device contains preferably a sorption medium which is regenerable by heating.

By preference, the circulation pump is arranged inside the working space concerned so that no special demands need be made on its tightness.

In a further embodiment, the pump arrangement of the common unit contains an oil-free high vacuum pump and an oil-free positive-displacement pump succeeding the former.

An element containing the common unit and the device for binding of the gases to be removed are preferably arranged in series with a pump in a gas circuit. The common unit may contain a plurality of different, selectively connectable arrangements for binding of the gas components to be removed.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DETAILED DESCRIPTION OF THE PREFERRED EMBODIMENTS

Figures 1, 2, 3, 4:
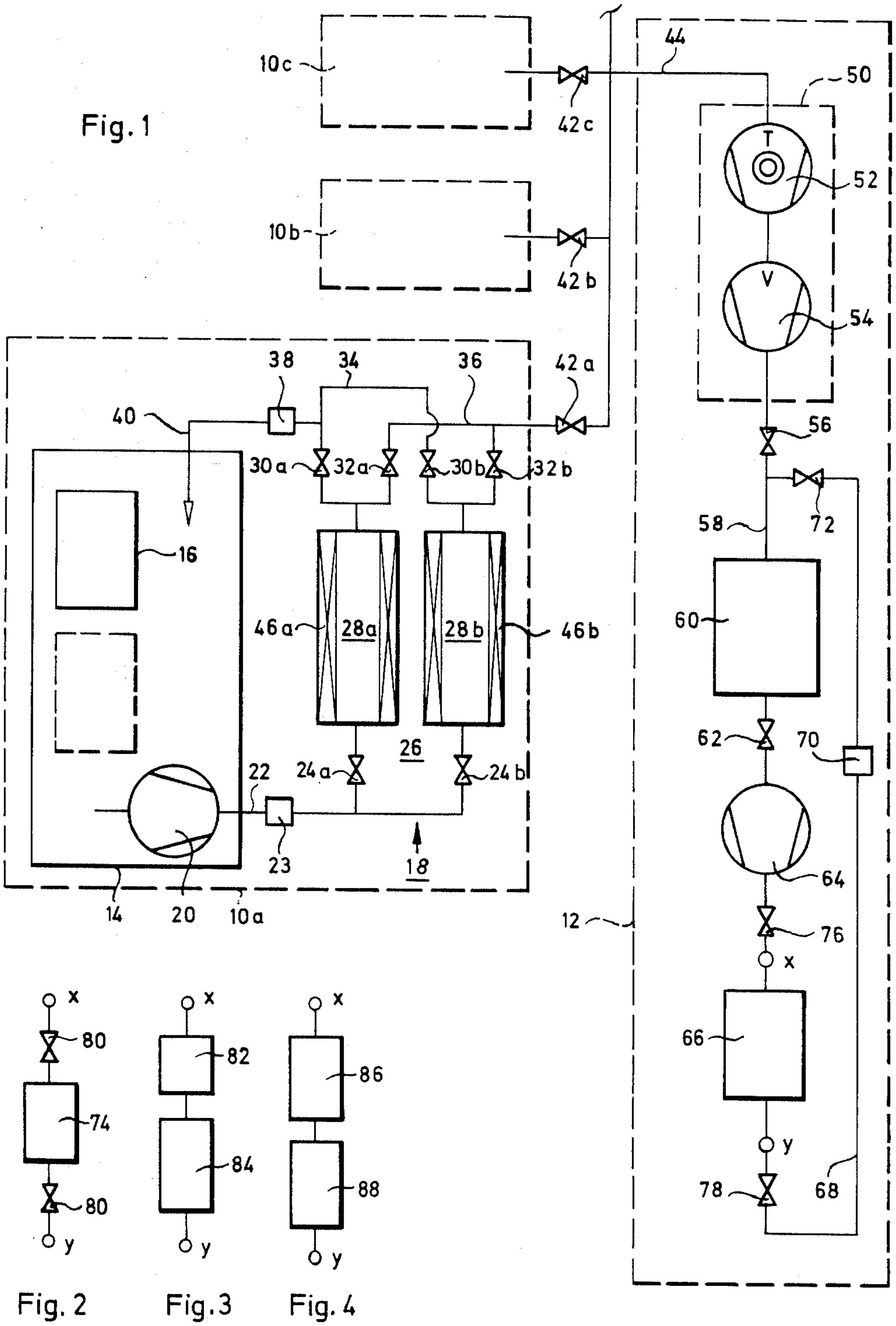
FIG. 1 is a schematic representation of a preferred embodiment of a tritium retention system in accordance with the present invention.
FIGS. 2 to 4 are various forms of embodiments of tritium removal installations for the system as per FIG. 1.

The tritium retention system shown in FIG. 1 is composed of a plurality of individual units 10*a*, 10*b*, 10*c*, and a common unit 12. The individual units 10*a*, 10*b*, 10*c* are each associated with a containment, such as a glove box, a caisson and the like. Since in principle they are similar, only the unit 10*a* is represented and described in detail below.

The unit 10*a* comprises a contained working space 14 in which is housed a tritium experimental or operating arrangement 16 or several such arrangements. The working space 14 is connected into a sorption circuit 18 which contains a blower 20 arranged in the working space 14. The blower 20 conveys the gas contained in the working space 14 through a line 22, which includes an activity measuring point 23, e.g., with an ionization chamber, into a sorption device 26. (The term "sorption" is to comprise adsorption and absorption.)

The sorption device 26 contains two sorption columns 28*a*, 28*b*, whose intakes can be selectively connected with the line 22 by means of a valve 24*a* and 24*b*, respectively. The outlets of the sorption columns can be connected with a line 34 by way of further valves 30*a* and 30*b*, respectively. The line 34 is connected via a further activity measuring point 38 with an intake line 40 which opens into the working space 14. Furthermore, the outlets of the sorption columns 28*a*, 28*b* can be connected by means of a valve 32*a* and 32*b*, respectively, with a line 36. The line 36 is connected by way of a shut-off valve 42*a* with a collecting line 44 which leads to the intake of the common unit 12.

The sorption columns 28*a*, 28*b* are each provided with a heating device 46*a*, 46*b*, respectively, serving regeneration.

The common unit 12 contains a pump arrangement 50 whose intake is connected with the collecting line 44. The pump arrangement 50 comprises a turbo-molecular pump 52 whose intake is connected with the collecting line 44 as well as a dry (oil-free) positive-displacement pump 54, e.g., a reciprocating pump, whose intake communicates with the outlet of the turbo-molecular pump 52.

The outlet of the positive-displacement pump 54 is connected by way of a shut-off valve 56 with the inlet 58 of a vessel 60 whose outlet is connected with the inlet of a dry (oil-free) diaphragm compressor 64 via a shut-off valve 62. The outlet of the diaphragm compressor is connected with the inlet X of a tritium removal device 66 which will be further described with reference to FIGS. 2 to 4. The outlet Y of the tritium removal device 66 communicates with the inlet 58 of the vessel 60 by way of a closed-circuit line 68 which contains an activity measuring point or device 70 and a shut-off valve 72.

For tritium removal, various known devices may be employed alone or in combination. The device 66 in accordance with FIG. 2 may operate by pressure tritiation of linoleic acid in the presence of a Pd catalyst in a disposable vessel 74. For the purpose of simple and safe exchange of the vessel, there are provided between the pump 64 and the intake X, as well as between the outlet Y and the closed conduit 68, one shut-off valve each, 76 and 78, respectively. Removal of tritium by means of linoleic acid is described for example in U.S. Pat. No. 4,490,288. The disposable vessel contains an insert saturated with lineolic acid and Pd catalyst. This insert can be closed-off by shut-off valves 80, and, following saturation with tritium, can be exchanged and stored as a whole.

In accordance with FIG. 3, the unit 66 may contain a catalyst chamber 82 and a successive absorber chamber 84. In the catalyst chamber 82, the gaseous $T_2$ is oxidized, and the tritium-containing water produced thereby is absorbed in a molecular sieve insert in the absorber chamber 84. The absorber chamber 84 may be rendered as a disposable vessel in a manner similar to that show in FIG. 2.

The absorber chamber 84 may also contain a material such as burnt lime or gypsum in which the tritium-containing water is bound chemically or as water of crystallization.

In accordance with FIG. 4, the unit 66 contains firstly an absorber chamber 86 for absorption of tritium containing water by means of a molecular sieve (e.g., that sold under the Trademark Zeolith) by gypsum, burnt lime and the like, and successively an absorption unit 88 for absorption of gaseous $T_2$ under pressure. In this case, the valve 78 is provided as a throttle valve in order to generate the necessary pressure in the unit 88.

During operation of the aforedescribed arrangement, the atmosphere of each individual containment 14 is circulated by means of the blower 20, dimensioned in accordance with the size of the containment, through the connected-insorption column 28*a* or 28*b*. The columns 28*a*, 28*b* are dimensioned in such a manner that a multiple of the entire tritium stock can be adsorbed on the soprtion medium. An activated palladium metal on an alpha aluminum oxide substrate material may be employed as the sorption medium. The column filling is activated by heating at reduced pressure. This is obtained preferably at 200° to 300° C. and a pressure of $10^{-1}$ to $10^{-2}$ Pa. The heating time will be a few hours, generally between two and six hours, depending on the preceding charging process.

On the sorption medium are bound reversibly, by adsorption and solution, respectively, gaseous tritium ($T_2$) and tritium-containing water vapor (THO and $T_2O$). In the sorption medium are also bound other substances from the circulated gas, such as normal water vapor and oxygen. This results in a faster saturation of the sorption medium and shorter regeneration periods.

One consequence of an oxygen sorption by the sorption medium is the conversion of the adsorbed tritium into THO and $T_2O$, respectively. This process occurs in part already during the adsorption process; the complete conversion occurs during the heating of the sorption material at reactivation.

When the sorption medium in the sorption column 28*a* is saturated to a defined degree, which can be determined by comparison of the radioactivities measured by 23 and 38, the sorption column 28*a* is separated from the circuit and sorption column 28*b* is connected in place thereof. Towards such end, valves 24*a* and 30*a* are closed, and valves 24*b* and 30*b* are opened instead. Valves 32*a* and 32*b* are also closed.

Regeneration and reactivation of the sorption medium in the sorption column 28*a* is obtained by means of the common unit 12. To accomplish this, the valves 32*a* and 42*a* are opened (the valve 42*b*, 42*c* are closed); the heating device 46*a* is connected, the pump arrangement 50 is started, and the valve 56 is opened. The valves 62 and 72 remain closed. During heating of the sorption medium in column 28*a*, a vacuum of at least $10^{-1}$ to $10^{-2}$ Pa is produced in column 28*a* by the turbomolecular pump 52, and thereby, the sorbed substances are carried off. The gas drawn off by the high-vacuum pump 52 is transported by the positive-displacement pump 54 into the vessel 60 serving as intermediate storage. The heating device 46*a* forming a heating jacket heats the sorption medium, which in a preferred embodiment consists of activated palladium metal on an alpha aluminum oxide substrate material, to approximately 200° to 300° C. When the sorption medium is regenerated, the valves 32*a*, 42*a* as well as 56 are closed, and the pump arrangement 50 is stopped. The tritium-containing gas mixture in the vessel 60 can now be processed under controlled conditions. Towards such end, the valves 62, 72, 76 as well as 78 are opened, and the pump 64 is started. Now the gas mixture from the vessel 60 is circulated through the tritium removal device 66 in which in which the tritium and/or the tritium-containing water are bound, which is monitored by means of the activity measuring point or device 70.

The central or common unit 12 can be connected by means of the valves 42*b*, 42*c* as necessary with the other individual units 10*b*, 10*c*.

The arrangement in accordance with the invention offers a number of substantial advantages.

The sorption columns 28*a*, 28*b* can be specially adapted to the experiments and devices 16 comprised by the associated unit 10. The capacity of the sorption column is designed in conformity with the tritium stock and the hazard potential. The same is true for the blower 20 whose delivery capacity may be rendered so as to correspond to the volume of the associated containment 14.

As many individuals units as desired may be connected with the central or common unit 12 by means of the collecting line 44.

When the sorption medium, e.g., of column 28*a*, is exhausted, the redundant sorption column 28*b* can be operated until the first sorption column 28*a* is regenerated. Thus, when column 28*b* is a main sorption column, the second sorption column can be designed smaller as regards capacity in that in principle, it is needed only during the regeneration of the "main column."

The central or common unit 12 which contains the pump arrangement 50, the vessel 60 and the compressor 64, i.e., the costliest components of the plant, needs to be present only once.

If predominantly tritium-containing water needs to be removed from the containments, the final removal of the tritium will be effected preferably in accordance with the oxidation/absorption principle. If, however, mainly gaseous $T_2$ is produced, the TROC method (binding of the tritium on an unsaturated organic compound) will offer advantages.

If tritium-containing water exclusively is to be removed, which is the case when $O_2$ is bound simultaneously with the tritium on the sorption medium, other drying agents can be employed as molecular sieves, e.g., lime, gypsum, etc. in the removal arrangement.

The removal device 66 may also contain a plurality of removal units, e.g., such as in FIGS. 2 to 4, which can be connected selectively into the circuit by way of the corresponding valves.

EXAMPLE

In a practically realized example of an embodiment of the invention, the containment 14 is a glove box having a volume of 6 $m^3$ and an He atmosphere. The blower 20 has an output of 20 $m^3$ /h so that the atmosphere of the glove box is circulated approximately three times per hour. The absorption column 28*a* is composed of a cylindrical stainless steel tube with a diameter of 20 cm and a height of 2 m. In the tube are placed ten baskets with 2 kg each of a $Pd/Al_2O_3$ absorption agent (0.5% Pd on spheres of alpha $Al_2O_3$ having a diameter of 4 mm) on wiremesh sieves, thus a total of 20 kg. This absorption medium is activated prior to use in that it is heated to 220° C. under a vacuum of $10^{-2}$ Pa for approximately 4 hours. Thereby all traces of moisture and gases are driven out.

In a first test, 600 ml $H_2$ was injected into a glove box which, converted to $T_2$, corresponded to approximately 1500 Ci, i.e., about 250 Ci/$m^3$, and the blower was started when the adsorbent was cooled off. After as little as thirty minutes operating tie, no $H_2$ could any longer be determined in the glove box, which means that within that period, more than 99% of the initial concentration could be removed by adsorption.

In a second test with tritium and THO, it was found that while the adsorption of $T_2$ occurred faster than that of THO, the latter was still adsorbed with sufficient rapidity, so that a residual activity of only a few $\mu$Ci/$m^3$ could be attained in a relatively short period of time.

In a modification of the aforedescribed arrangement, the central unit is not fixedly connected with the units 10*a*, 10*b*, 10*c* but rendered rather as a movable unit which can be moved as needed to the various units 10*a*, 10*b*, 10*c* and connected by means of a suitable tubular line coupling to a specific unit 10*a*, 10*b*, 10*c* whose sorption arrangement is to be regenerated at the time.

While the invention has been illustrated and described as embodied in an arrangement for cleaning of the gaseous atmospheres of a plurality of separate, contained working spaces, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by letters patent is set forth in the appended claims.

I claim:

1. An arrangement for cleaning gaseous atmospheres by removal of noxious, in particular radioactive, gases, the arrangement comprising in combination: a plurality of separate, contained working spaces containing gaseous atmospheres; a plurality of individual gas circuits each of said gas circuits being connected to one of said plurality of working spaces and being constructed for specific atmospheric conditions in said one corresponding working space which it is employed with, each of said gas circuits being provided with a circulation pump, regenerable absorbent means for separating and temporarily intermediately storing gases to be removed, and means for releasing the intermediately stored gases in said regenerable absorbent means; a common gas removal unit selectively connectable to any one of said gas circuits; and means for selectively connecting said gas removal unit with any one of said plurality of individual gas circuits, said common gas removal unit including a vacuum pump arrangement constructed so as to draw-off the gases released in said regenerable absorbent means which is in flow communication with said common gas removal unit at a given time, a vessel positioned and arranged so as to receive the drawn-off gases, means for connecting said vessel to said vacuum pump arrangement and means connected with said vessel for binding the gases.

2. An arrangement as defined in claim 1, wherein said regenerable means includes a regenerable tritium sorption unit, said common gas removal unit further including a device for binding tritium-containing components of the drawn-off gases.

3. An arrangement as defined in claim 2, wherein said regenerable tritium sorption unit contains a sorption medium which can be regenerated by heating.

4. An arrangement as defined in claim 3, wherein said sorption material is activated palladium metal on an alpha aluminum oxide substrate material.

5. An arrangement as defined in claim 1, wherein the circulation pump of each of said individual gas circuits is arranged within said corresponding working space of said gas circuit connected thereto.

6. An arrangement as defined in claim 1, wherein said common unit includes a gas flow path, said vacuum pump arrangement of said common unit including an oil-free vacuum pump, an oil free positive-displacement pump and means for connecting said oil-free vacuum pump and said oil-free positive displacement pump so that said oil-free positive displacement pump succeeds said oil-free vacuum pump in said gas flow path.

7. An arrangement as defined in claim 1, wherein said common unit further includes an additional pump, said vessel of said common unit and said means for binding the gases to be removed being connected in series with said additional pump in one of said plurality of gas circuits.

8. An arrangement as defined in claim 1, wherein said common unit further includes a plurality of different, selectively connectable binding devices for binding the gas components to be removed, and means for selectively connecting said plurality of different, selectively connectable binding devices to said vessel.

9. An arrangement as defined in claim 8, wherein said plurality of binding devices includes at least one binding device for binding tritium containing gas components.

10. An arrangement as defined in claim 1, wherein said regenerable absorbent means includes a plurality of selectively utilizable regenerable sorption column means for separating and intermediately storing the gases to be removed.

* * * * *